United States Patent [19]

Kanamori et al.

[11] Patent Number: 4,737,919
[45] Date of Patent: Apr. 12, 1988

[54] NUMERICAL CONTROL SEQUENTIAL TRANSLATOR

[75] Inventors: Takaaki Kanamori; Ahihiko Fujimoto, both of Nagoya; Hidemasa Iida, Kasugai, all of Japan

[73] Assignee: Mitsubishi Denki Kabushiki Kaisha, Tokyo, Japan

[21] Appl. No.: 77,996

[22] Filed: Jul. 24, 1987

Related U.S. Application Data

[63] Continuation of Ser. No. 921,828, Oct. 22, 1986, abandoned, which is a continuation of Ser. No. 534,578, Sep. 22, 1983, abandoned.

[30] Foreign Application Priority Data

Sep. 28, 1982 [JP] Japan .................................. 57-168791

[51] Int. Cl.⁴ ...................... G06F 15/46; G05B 19/18
[52] U.S. Cl. .................................... 364/474; 364/191; 364/171
[58] Field of Search ............... 364/474, 475, 167–171, 364/191–193; 318/568

[56] References Cited

U.S. PATENT DOCUMENTS

| | | | |
|---|---|---|---|
| Re. 31,247 | 5/1983 | Johnstone | 364/167 |
| 4,314,330 | 2/1982 | Slawson | 364/171 X |
| 4,356,552 | 10/1982 | Imazeki et al. | 364/474 |
| 4,395,757 | 7/1983 | Bienvenu et al. | 364/200 |
| 4,482,968 | 11/1984 | Inaba et al. | 364/167 |
| 4,484,286 | 11/1984 | Nagamine et al. | 364/167 X |

Primary Examiner—Joseph F. Ruggiero

[57] ABSTRACT

A numerical control system having a control unit; an input unit to which machine tool control information is supplied in the form of a high level language; a memory unit having a translator to which the control information is supplied from the input unit in accordance with instruction of the control unit, and which translates it into a machine language; an arithmetic unit which processes the control information translated in the machine language in accordance with instruction of the control unit to be stored into the memory unit; and finally an output unit which reads the processed control information from the memory unit to an external machine tool. The control system also has sensors for detecting completion of a machining step of the machine tool and produces a feedback data and supplies it to the input unit.

1 Claim, 2 Drawing Sheets

NUMERICAL CONTROL SEQUENTIAL TRANSLATOR

This application is a continuation of application Ser. No. 921,828, filed Oct. 22, 1986, abandoned, which in turn is a continuation application of Ser. No. 534,578, filed Sept. 22, 1983, abandoned.

BACKGROUND OF THE INVENTION

This invention relates to a numerical control system for numerically controlling machine tools.

Currently, a numerical control system is used for machine tools and thereby workpieces can be machined easily with high accuracy into any complicated shape.

A conventional numerical control system provides a control unit and workpiece can be machined in the following steps: data is read through an input unit from an input medium such as punched paper tape under the control of control unit, the data read causes the control unit and operation unit to process in accordance with memory contents stored in a memory unit, a machining data is supplied to a control object machine through an output unit based on the processing result, and such control object machine is controlled in accordance with machining data.

However, in the above conventional numerical control system, a specification program stored in the memory unit is previously fixed. Moreover, an expression indicating respective functions is used in programs to be input. For example, G01 is assigned to linear interpolation and the following expression is used, G01X1000Y-500F200. G01 means linear interpolation and the value following X means movement of work in the X axis direction, while value following Y means movement of a workpiece in the Y axis direction and value following F means a machining speed. In this case, a numerical control system reads the data, G01X1000Y-500F200 and judges the linear interpolation required and drives the means for driving the table in the directions of X axis and Y axis for the rate of 2:1 in the speed of vector direction of 200. The location of the table after movement by such driving is detected by a table location sensor whose output is fed to a numerical control system, and when a numerical control system has detected from an output of the table location sensor that the table has moved for 1000 in the direction of X axis and for −500 in the direction Y axis, the table driving means stops operation, the next program is executed and the machining is carried out in accordance with such program.

However, such conventional numerical control system has the disadvantage that a program becomes redundant because a program written by the codes preset in accordance with the functions of the numerical control system must be given, and the numerical control system cannot operate with a program written in a language not related to the code preset in accordance with said functions.

SUMMARY OF THE INVENTION

It is an object of this invention to provide a numerical control system which can be operated even with a program written in a language not related to the preset code in accordance with the functions of a numerical control system.

It is another object of this invention to provide a numerical control system which can meet versatile demands of numerical control system users.

According to this invention, such objects can be attained by a numerical control system comprising an input unit to which control data is supplied, a memory unit, an operation unit which generates machine tool control data through arithmetic operations based on stored contents of the memory unit, an output unit which outputs machine tool control data to a machine tool, and a control unit which controls input operation of control data sent from the input unit, arithmetic operation of the operation unit and write and read operations of the memory unit and sequentially outputs machine tool control data for each detection of the end of one machining step by receiving feedback data from the machine tool and by detecting the end of one machining step;

wherein the memory unit is composed of a translator which translates control data given in a language other than the machine language supplied from an input unit into the machine language and stores a first program which generates a class of machining and machining data corresponding to each machining step of the machine tool based on a given control data, a machining class data storing part which stores maching class data of each machining step translated into the machine language by the translator, a machining data storing part which stores machining data translated into the machine language by the translator, a command data storing part which stores, as the command data, the machining data of two steps or more to be machined by a machine tool in the address assigned corresponding to machining class and also operates as a buffer, a movement data storing part which stores, as the movement data, command data of the first machining step stored in said command data storing part in the address assigned corresponding to machining class, and an operation program storing part storing a second program which judges the machining class from address storing movement data and generates machine tool control data to the operation unit by making reference to the movement data stored in the movement data storing part; to thereby transfer a command data corresponding to the next machining step being stored in the command data storing part to the movement data storing part for each end of one machining step, and also transfers machining data of the next machining step of the last machining step stored in the command data storing part from the machining data storing part.

DETAILED DESCRIPTION OF THE EMBODIMENT

A preferred embodiment of this invention is explained with reference to drawings.

Figure 1:
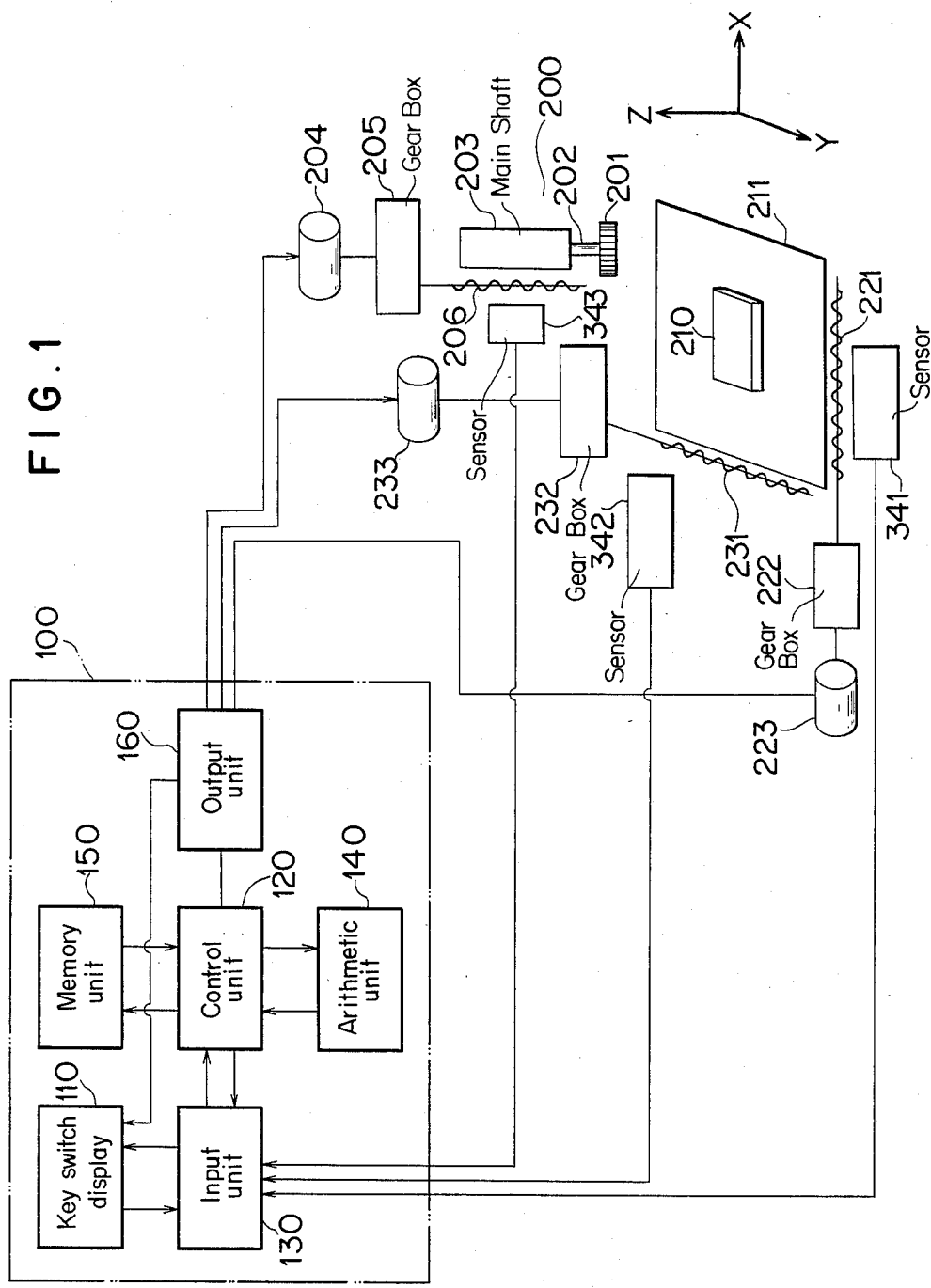
FIG. 1 is a block diagram indicating a preferred embodiment of this invention.

In FIG. 1, 100 indicates a numerical control system shown as an embodiment of this invention; 200 is a machine tool controlled by an output of the numerical control system 100.

The numerical control system 100 has an input unit 110 comprising input key switch and display, a control unit 120, an input unit which supplies input data sent from the input unit 110 and data sent from a location sensor 341 described later to the control unit 120 in accordance with an instruction of the control unit 120, an operation unit 140 which processes by arithmetic operation, in accordance with instruction of the control unit, the input data read through the input unit 130, a memory unit which stores and reads, in accordance with instruction of the control unit 120, the arithmetic operation result and input data input through the input unit, and an output unit 160 which outputs, in accordance with instruction of the control unit 120, the arithmetic operation result output from the memory unit 150 to the external unit or the display unit of the input unit 110.

In a machine tool 200, on the other hand, a tool 201 is held by a tool holder 202 which is mounted to the chuck of a main shaft 203. 206 is a ball screw for moving main shaft 203 in the direction of the Z axis and this ball screw 206 is driven by a Z axis feed motor 204 through a gear box 205. A workpiece 210 is fixed by a jig on a table 211 of the machine tool.

Meanwhile, 221 is a ball screw for moving the table 211 in the direction of the X axis and this ball screw 221 is driven by an X axis feed motor 223 through a gear box 222. The X axis feed motor 223 is driven by an X axis driving output sent from the output unit 160. In the same way, 231 is a ball screw for moving the table 211 in the direction of the Y axis and this ball screw 231 is driven by a Y axis feed motor 233 through a gear box 232. The Y axis feed motor 233 is driven by a Y axis driving output sent from the output unit 160.

Moreover, the location of main shaft 203 after the movement in the Z direction is detected by a location sensor 343 and location detecting output of the location sensor 343 is supplied to the input unit 130 as a feedback signal. Similarly, the location of table 211 after the movement in the X direction is detected by a location sensor 341, while the location after movement in the Y direction is detected by a location sensor 342, and location detecting output of the location sensors 341 and 342 is supplied to the input unit 130 as a feedback signal.

Figure 2:
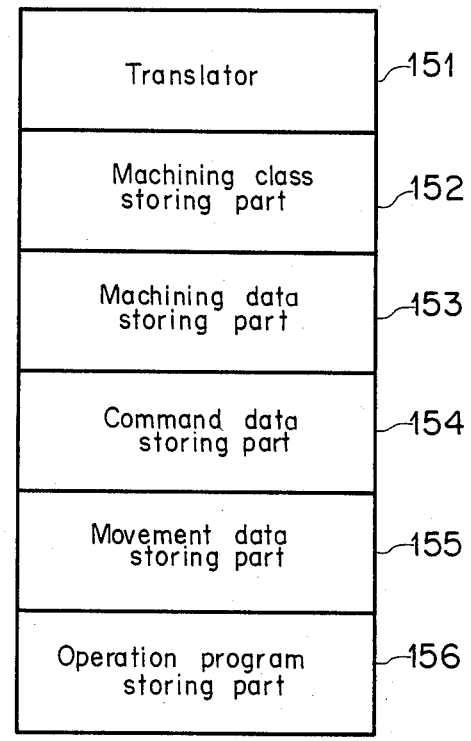
FIG. 2 shows structure of the memory unit in the block diagram of an embodiment of this invention.

For example, as shown in FIG. 2, the memory unit 150 is composed of a translator 151 which translates a high level language program read from the input unit into a machine language and stores a program for generating machining class and machining data corresponding to each machining step of the machine tool given by said program, a machining class storing part 152 storing machining class data of each machining step translated by the translator 151 and expressed by a machine language, a machining data storing part 153 storing machining data translated by the translator 151 and expressed by a machine language, a command data storing part 154 which stores machining data of two steps or more machined by machine tool 200 as the command data and also operates as a buffer, a movement data storing part 155 storing command data corresponding to the first step in the command data stored in the command data storing part 154 as the movement data, and an operation program storing part 156 which stores a program for executing arithmetic operation in the operation unit 140 to the X, Y and Z axis driving outputs corresponding to the movement data of the movement data storing part 155 with refrence to the stored content of the movement data storing part 155; and the translator 151 and operation program storing part 156 always reside, for example, in the ROM. The machining class storing part 152, machining data storing part 153, command data storing part 154 and movement data storing part 155 are provided in the specified area of the RAM. An operation program stored in the operation program storing part 156 is provided corresponding to the functions of numerical control system 100, and the command data, movement data to be stored in the command data storing part 154 and movement data storing part 155 are respectively stored in the addresses of the command data storing part 154 and movement data storing part 155 assigned for the machining class to such command data and movement data. For example, when a command data stored relates to a linear interpolation, it is stored in the address A assigned corresponding to the linear interpolation of the command data storing part 154.

When a series of machining programs written in a high level language are input from the input key switch of the input unit 110, these programs are read sequentially under the control of the control unit 120 through the control unit 120. Then, these programs are translated into the machine languages by the programs stored in the translator 151 and translated programs are sorted into the machining class and machining data of a machine tool 200. The machining class translated into the machine language is stored in the machining class storing part 152, while the machining data translated into the machine language is stored in the machining data storing part 153. Here, the programs of the translator 151 include a program for issuing the commands which instruct to which address in the command data storing part 154 the machining data stored in the machining data storing part should be transferred.

When a start instruction is issued from the input key switch under this condition, a machining data corresponding to the first and second steps machined by a machine tool 200 is transferred to the address corresponding to the machining class of the command data storing part 154 based on the machining class stored in the machining class storing part 152, and thereafter the machining data of the first step transferred to the command data storing part 154 is transferred to the address corresponding to the machining class of movement data storing part 155. When machining data is transferred to the movement data storing part 155, the operation program storing part 156 judges the machining class from the address storing the movement data storing part 155 and causes the operation unit 140 to perform the operations corresponding to the machining class corresponding to the address with reference to the machining data stored in the movement data storing part 155. For example, as explained above, when movement data is stored in the address A of the movement data storing part 155, it is designated from the address storing the machining data that machining with linear interpolation should be performed. In case such machining data are 1000, −500, 200 as explained above, such data is considered as meaning that movement in the X axis direction is 1000, movement in the Y axis direction is −500 and machining speed is 200. Thereby, an operation program is supplied to the operation unit 140 in order to operate the rotating direction and rotating speed of the X axis driving motor 223, rotating direction and speed of Y axis driving motor 233. Values operated by the operation unit 140 are supplied respectively through the output unit 160 under the control of the control unit 120. Namely, the X axis driving output is sent to the X axis feed motor 223, and the Y axis driving output to the Y axis feed motor 233.

As a result, the table 211 moves in the direction and at the speed determined by the rotating direction and speed of the X axis feed motor and rotating direction and speed of the Y axis feed motor and thereby a workpiece 210 is machined. This operation is similar to the conventional system. Location of table 211 after the movement is always detected by the location sensors 341 and 342 and these data are fed back through the input unit 130. When movement in the X direction becomes 1000 and that in the Y direction becomes −500, the control unit 120 judges that the first machining step is completed, and the memory unit 150 receives an output of the control unit 120 and transfers the machining data of the second step stored in the command data storing part 154 to the movement data storing part 155. Here the machining data of the third step is transferred to the command data storing part 154 from the machining data storing part 153, and the operation program storing part 156 causes the operation unit 140 to execute the operation based on the machining data of the second step transferred to the movement data storing part 155. Thereby, the machining of the second step is carried out in the same way as explained above. As explained above, machinings of the second step, third step, ... are carried out and when a series of machining programs written in a high level language given from the input unit 110 are executed completely, the executions stop.

According to this invention, as explained above, since the translator 151, machining class storing part 152, and machining data storing part 153, are provided, programs written in a high level language are translated into the machine language and the machining class and machining data produced from such machine language programs are stored, and a command is issued as the numerical data for controlling a machine tool, it is no longer necessary to give programs written in the codes preset in accordance with the functions of the numerical control system, programming has become easy and versatile requirements of numerical control system users can be met.

For example, in case it is required to repeat several times the machining of the same class by changing only a machining data, only a data is changed but the program G01X0000Y000F000 must be input for several times in the conventional numerical control system, but in the present system it is enough to input only a data of number of repetitions and the step data. In addition, it is also possible to newly generate machining data within the programs by judging a result of the functional operation.

What is claimed is:

1. A numerical control system for a machine tool comprising, in combination,
   a machine tool;
   a control unit;
   an input unit operatively connected to said control unit for receiving machine tool control data in the form of a high level language and for supplying said control data to said control unit;
   a memory unit operatively connected to said control unit for receiving said control data, said memory unit including a translator for translating said received control data into a machine language, means for storing a program of machining class data expressed in said machine language, means for storing machining data expressed in said machine language corresponding to each machining step to be performed by said machine tool, means for storing command data of two or more steps of machining data to be performed by said machine tool expressed in said machine language, movement data means for storing command data corresponding to the first step of said command data stored in said command data storing means;
   an arithmetic unit operatively connected to said control unit for processing data corresponding to the movement data in said movement data storing means in accordance with said operation program and for transferring said processed data to said control unit;
   an output unit operatively connected to said control unit for supplying said processed data to said machine tool for controlling the movements of said machine tool; and
   sensor means operatively connected to said machine tool and to said input unit for detecting completion of a machining step by the machine tool and for producing feedback data and for supplying the same to the input unit.

* * * * *